HIGH FREQUENCY PULSE BRANCHING AND COUPLING NETWORK

Filed Oct. 11, 1965 3 Sheets-Sheet 1

INVENTORS
CHARLES W. EDDY
LEROY A. PROHOFSKY
BY Herbert [signature]
ATTORNEY

HIGH FREQUENCY PULSE BRANCHING AND COUPLING NETWORK

Filed Oct. 11, 1965 3 Sheets-Sheet 2

INVENTORS
CHARLES W. EDDY
LEROY A. PROHOFSKY
BY Herbert F. Sonnemeyer
ATTORNEY

Sept. 20, 1966 C. W. EDDY ETAL 3,274,520

HIGH FREQUENCY PULSE BRANCHING AND COUPLING NETWORK

Filed Oct. 11, 1965 3 Sheets-Sheet 3

INVENTORS
CHARLES W. EDDY
LEROY A. PROHOFSKY
BY Thomas J. Nikolai
ATTORNEY

United States Patent Office 3,274,520
Patented Sept. 20, 1966

3,274,520

HIGH FREQUENCY PULSE BRANCHING AND COUPLING NETWORK

Charles W. Eddy, St. Paul, and Le Roy A. Prohofsky, Minneapolis, Minn., assignors to Sperry Rand Corporation, New York, N.Y., a corporation of Delaware

Filed Oct. 11, 1965, Ser. No. 500,465
8 Claims. (Cl. 333—9)

Figure 1:
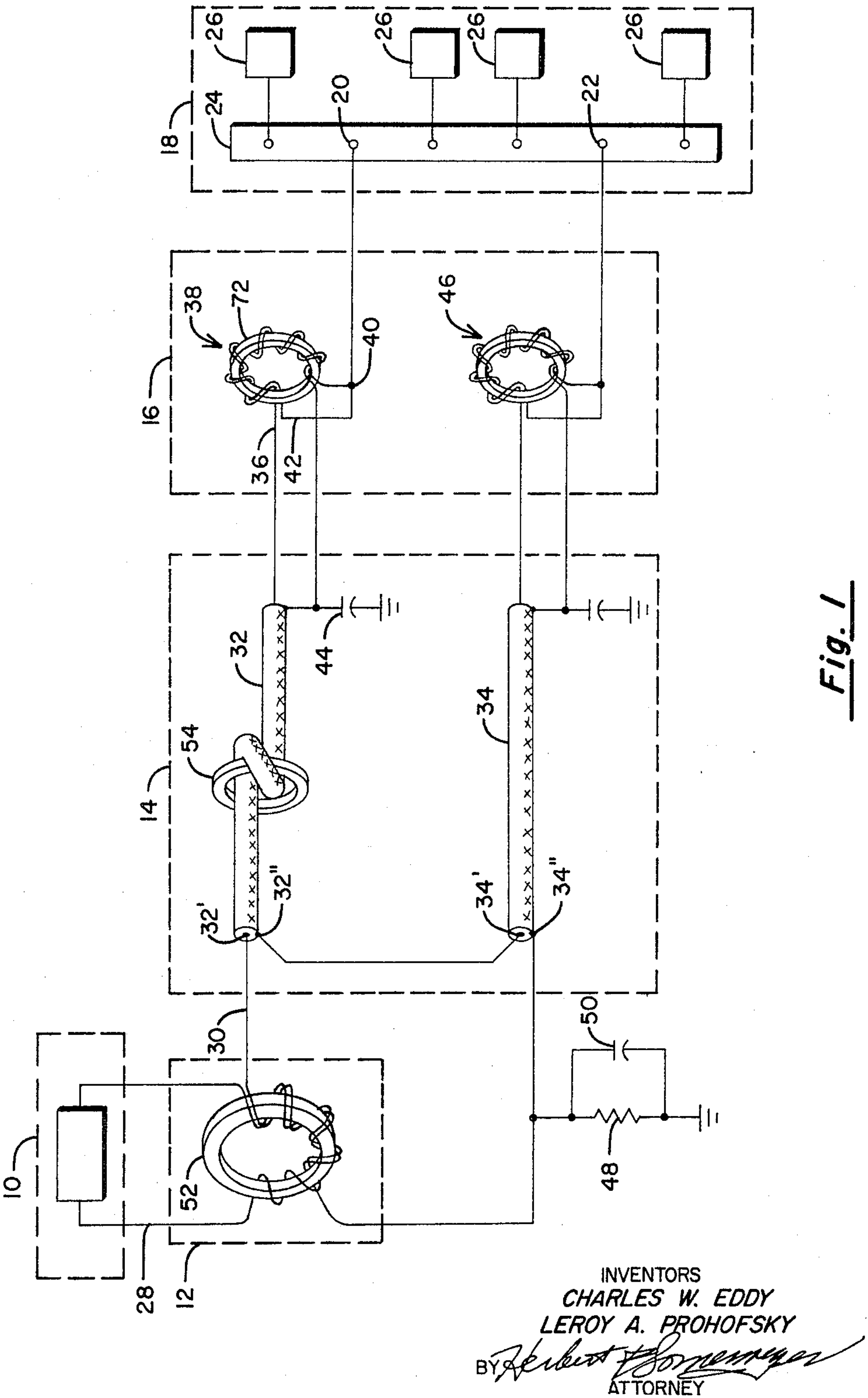

This is a continuation-in-part application of our copending parent application Ser. No. 173,402, filed Feb. 15, 1962, now abandoned.

This invention relates to electrical transmission line pulse transformer/distributors and has particular reference to a class of such items that provides transmission of a pulse type signal from a high frequency, high impedance, pulse generator to a low impedance bus-bar distribution system.

The invention disclosed herein has particular application to a stored-program, synchronous, electronic data processing system wherein all control operations are defined by reference to a master clock signal. The idealized concept of such a system consists of four basic units: arithmetic, control, memory and input-output. In general, these units are controlled by sending control pulses to them over a set of wires that are usually called "command lines." Each command line has a specific purpose, such as transferring a number from one register to another, shifting a number in a register, resetting a flip-flop, or any one of a multitude of other functions. Usually it is neecssary to transmit control pulses, appropriately sequenced in time, over several different command lines to execute any one given instruction. The circuit arrangement to be used in any given case for distributing the control pulses on the command lines depends a large measure on the organization of the computer as a whole, and in existing machines great variations will be found when comparing one computer with the next.

The basic source of control pulses is generally a continuously running multivibrator that drives a ring counter, usually referred to as the "clock ring." Timed clock pulses are obtained from each stage of the clock ring and one complete set of timed pulses is called a "cycle." At least two cycles are required to perform any arithmetic or other operation; one cycle, called the "instruction cycle," is used to transfer the instruction from the main storage to the operation-address register, and then at least one execution cycle is needed for the actual performance of the operation. The timed clock pulses of the ring are, therefore, sent through a switching network that distributes them to the various command lines as called for by the operation and the status of certain signals applied to the switching network as "miscellaneous inputs."

In the particular electronic data processing system in which the invention disclosed herein is used, the clock pulse source, the clock ring, operates at a frequency of 10 megapulses per second and is coupled to a large, heavily loaded bus-bar, from which the clock signals are distributed throughout the electronic data processing system. Prior art devices utilized to drive the clock pulse bus-bar distribution system have proven to be inefficient due to the high-power, high-speed limitations of present components. The input impedance of the clock pulse bus-bar distribution system as seen by the clock pulse source is fairly low and the required power to drive the clock pulse bus-bar distribution system is very high. Semiconductor devices arranged in emitter follower configurations have proved to be incapable of providing the required amplitude and rise time characteristics required of a clock pulse. Current steering circuits using semiconductor devices have also failed to meet the rise time and amplitude specifications of a clock pulse distribution system. The preferred embodiments of the invention as disclosed herein utilize a combination of a pulse transformer, a coaxial cable transmission line broad band transformer functioning as a current divider network that drives twisted pair broad band transformers. The combination is arranged in a manner to provide combined impedance transformation, transmission lines and current division for distribution of computer clock pulse signals from the clock pulse source to the low impedance bus-bar distribution system. The illustrated embodiments consist of a tandem configuration of a bifilar wound, toroidal core high frequency pulse transformer, a plurality of lengths of coaxial cable forming a broad band transformer splitting the signal to a plurality of very small, toroidal core broad band transformers made of twisted-pair lines.

Accordingly, a primary objective of the present invention is to provide a system whereby a high frequency signal is coupled to a heavily loaded, very low impedance bus-bar distribution system while maintaining desired pulse amplitude and rise and fall time characteristics.

A still further object of this invention is to provide a broad band impedance transformer to couple a high impedance, high frequency clock pulse source to a low impedance load while accommodating a substantial load variation with no serious signal resonances or signal degradation.

Figure 3A:
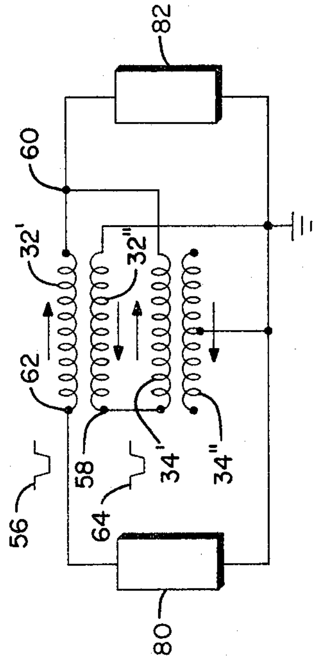
Figure 3B:
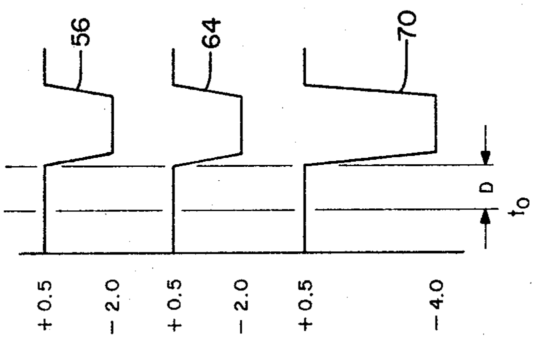
Figure 2A:
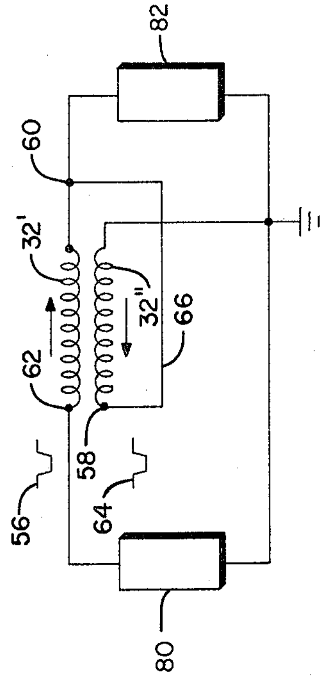
Figure 2B:
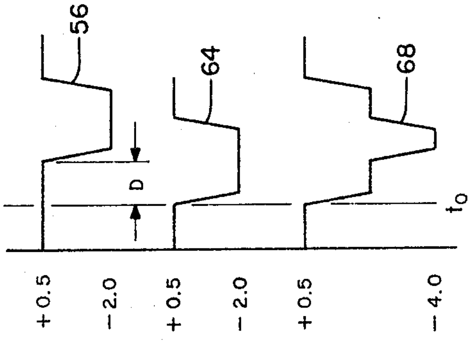
Figure 4:
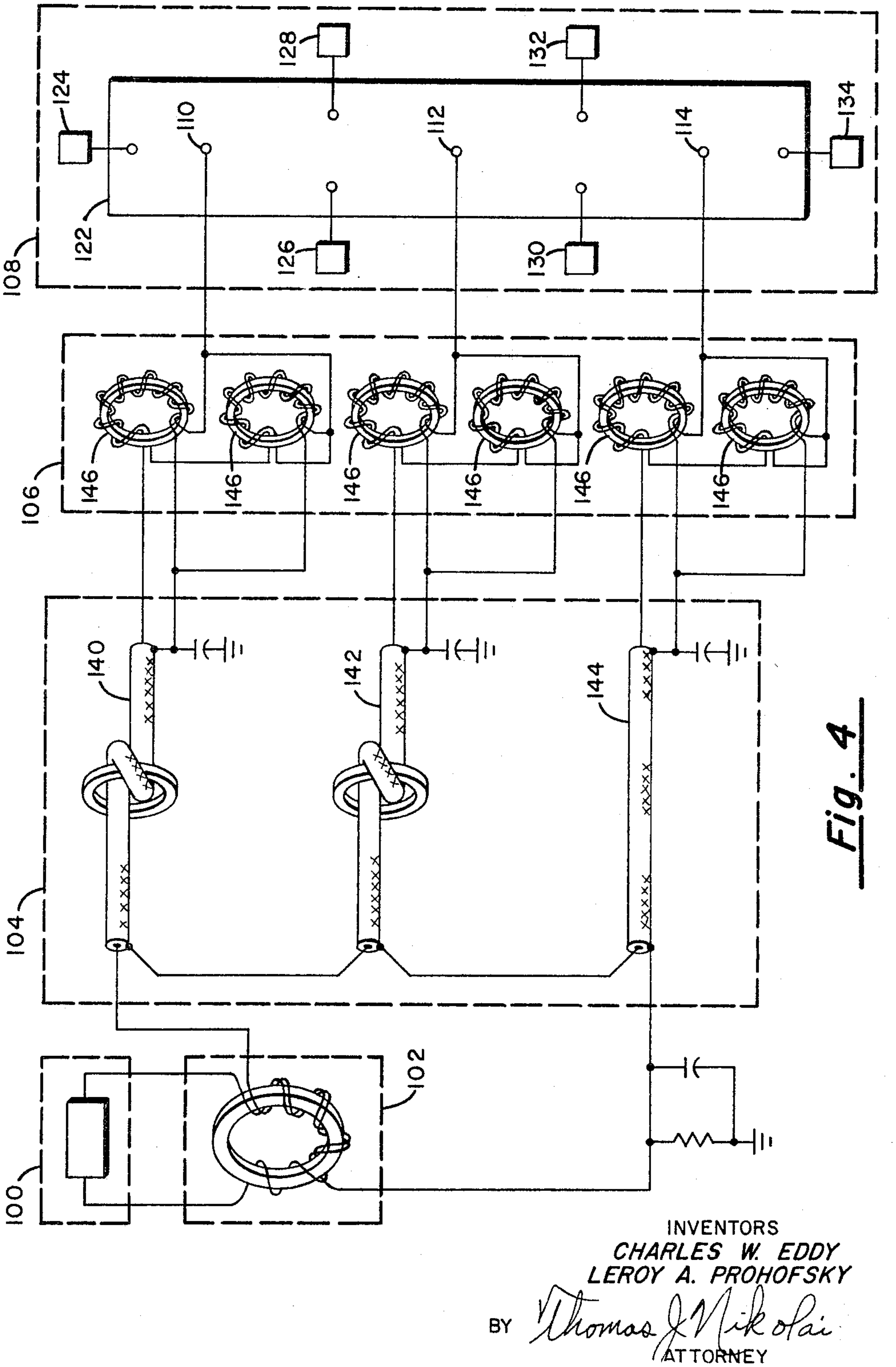

These and other more detailed and specific objectives will be disclosed in the course of the following specification, reference being had to the accompanying drawings in which:

FIG. 1 is a diagrammatic illustration of a first preferred embodiment of this invention which illustrates a combination of a pulse transformer and a transmission line broad band transformer in which the output is split and supplied to two transformers which are coupled to opposite ends of a bus-bar distribution system;

FIG. 2*a* is a diagrammatic illustration of the embodiment of FIG. 1 in which the coaxial cable transmission line is of such length as to provide a substantial delay of the signal therethrough and wherein an equalizing coaxial cable delay line is not utilized;

FIG. 2*b* is an illustration of the timing and form factor of the pulses associated with the circuit of FIG. 2*a*;

FIG. 3*a* is a diagrammatic illustration of the embodiment of FIG. 1 in which the coaxial cable transmission line is of such length as to provide a substantial delay of the signal therethrough and wherein an equalizing coaxial cable delay line is utilized;

FIG. 3*b* is an illustration of the timing and form factor of the pulses associated with the circuit of FIG. 3*a*;

FIG. 4 is a diagrammatic illustration of a second preferred embodiment of the present invention that may be typical of other arrangements of the embodiment of FIG. 1 as varied to accommodate the specific system requirements encountered.

The illustrated embodiment of FIG. 1 is a diagrammatic illustration of an exemplary embodiment of the present invention that advantageously employs a combination of a pulse transformer and a plurality of broad band transformers to provide current division and impedance transformation and further including coaxial cable transmission lines for the transmission of computer clock pulse signals to a bus-bar distribution system.

A stated above, the invention disclosed herein provides a solution to the problem encountered in high speed computing devices wherein a high speed—in the particular case encountered by the applicant such a frequency was 10 megapulses per second—clocking signal must be coupled to various loads over various distances without degradation of the pulse form factor. As is well known in the computing field, reliability of pulse rise time and fall time is essential to proper operation of logic and control circuits. However, prior art devices have a limited pulse transmission fidelity due to their high speed, high power limitations in applications where the load impedance is very low. The device disclosed herein is essentially a broad band transformer providing proper impedance matching between the pulse generator and the bus-bar distribution system.

FIG. 1 consists of pulse generator 10 driving input transformer 12 that drives current divider network 14 and output transformer 16, the outputs of which are coupled to bus-bar distribution system 18 at terminals 20 and 22 of bus-bar 24 from which a plurality of loads 26 are driven. In this embodiment the output of generator 10 is coupled across input winding 28 of bifilar wound input transformer 12 with the terminals of output winding 30 of transformer 12 being coupled to the input end of the center conductor 32' of coaxial cable 32 and of shield conductor 34'' of coaxial cable 34. The input end of the shield conductor 32'' of coaxial cable 32 is coupled to the input end of center conductor 34' of coaxial cable 34. The output end of center conductor 32' of coaxial cable 32 is coupled to the input end of winding 36 of twisted pair transformer 38, the output end of which is coupled at point 40 to terminal 20 on bus-bar 24. The output end of shield conductor 32'' of coaxial cable 32 is coupled to the input end of winding 42 of twisted pair transformer 38, the output end of which is coupled at point 40 to terminal 20 on bus-bar 24. Additionally, the output end of shield conductor 32'' of coaxial cable 32 is coupled to ground by way of capacitor 44. The output end of center conductor 34'' of coaxial cable 34 is coupled to terminal 22 of bus-bar 24 through twisted pair transformer 46 in a manner similar to that described as for coaxial cable 32. Finally, the input end of shield conductor 34'' of coaxial cable 34 is coupled to ground by way of a bias signal generating shunt arranged resistor 48 and capacitor 50.

In the illustrated embodiment of FIG. 1, pulse generator 10 presents a load impedance of approximately 300 ohms during pulse "ON" time while the effective load impedance as seen at bus-bar 24 was found to vary from 8 to 18 ohms with normal variations in load conditions and with a minimum load of 6 ohms under worst-case conditions. Under these conditions, an impedance transformer match of 300 ohms to 6.25 ohms is accomplished with negligible output pulse form factor variation realized over the normal bus-bar load variation except for the expected variation of pulse amplitude with load impedance. This impedance matching is accomplished through the use of input transformer 12 which has a primary to secondary turns ratio of 21 to 12, current divider network 14 which has an input to output impedance transformation of 2 to 1 transforming the individual coaxial cable impedance of 50 ohms at the input to 25 ohms at the output, and output transformer 16 which has an input to output impedance transformation of 4 to 1 transforming the input impedance of 25 ohms to an output impedance of 6.25 ohms at bus-bar distribution system 18.

It is to be recognized by one of ordinary skill in the art that in a normal application of the device disclosed herein the transmission distances between the pulse generator 10 and the plurality of bus-bar 24 in the distribution system varies over a wide range. However, for a plurality of pulse transformer/distributors each comprising similar cascaded components 12, 14 and 16 driving a different bus-bar 24 from the common pulse generator 10, are used all transmission lines 32, 34 of each pulse transformer/distributor must be of substantially the same length so as to provide clock signals of substantially similar delay times from pulse generator 10 to each bus-bar 24 of the system. Accordingly, for each system the maximum distance from the pulse generator 10 to a bus-bar 24 determines the length of all transmission lines 32, 34 of the system.

In one application a plurality of pulse transformer/distributors disclosed herein were utilized to provide a transmission system having transmission distances from pulse generator 10 to bus-bar 24 varying from 6.0 to 32.0 inches. As noted above and explained hereinbefore, coaxial cable 32 performs the function of a conventional transmission line plus that of an impedance transformer. Thus, with the above transmission distances, the illustrated embodiment of FIG. 1 was used in all cases with no variation being made in the transmission line length, the transmission line length being determined by the maximum transmission distance which length in this application was 62.0 inches.

A critical restriction is that the respective lengths of coaxial cables 32 and 34 in each system be within 0.5 inch to provide equalizing pulse delay compensation. As the transmission line length decreases from 62.0 inches to 6.0 inches this restriction becomes less critical. When the transmission line length becomes less than 12.0 inches it has been determined experimentally that coaxial cable 34 may be eliminated and center conductor 34' and shield conductor 34'' may be replaced by single line conductors.

Pulse generator 10 may be of conventional design, such as is well known in the art, to provide a substantially square wave clock pulse at a frequency of 10 magapulses per second. This signal is coupled to input winding 28 of transformer 12. Transformer 12 consists of input winding 28 and output winding 30 wound about toroidal core 52 as bifilar as the input to output turns ratio of 21 to 12 will permit.

Core 52 is formed of a material that has a high permeability at a low frequency which, in the embodiment of FIG. 1, is assumed to be 100 kilocycles/second. Output winding 30 couples the clock pulse signal to coaxial cables 32 and 34. Coaxial cables 32 and 34 are RG–178A/U type cable with cables 32 wound 10 times about core 54, which is a toroidal core of 0.875 inch O.D. and of a material having a high permeability at a low frequency, i.e., below 100 kilocycles/second. RG–178A/U types cable having a 50 ohms characteristic causes the impedance transformer-transmission line apparatus of cables 32 and 34 and core 54 to effect an impedance transformation of 2:1, or 25 ohms at each coaxial cable output end due to their being in parallel across output winding 30.

Significance of the use of coaxial cable 34 to effectuate a high fidelity transmission of a clock pulse signal is best explained with reference to FIGS. 2*a*, 2*b*, 3*a*, and 3*b*. FIG. 2*a* depicts a diagrammatic illustration of center conductor 32' and shield conductor 32'' of coaxial cable 32. Pulse generator 80 couples pulse 56 to center conductor 32' which is shown as a primary winding of a transformer formed by center conductor 32' and shield conductor 32''. With the input end of shield conductor 32' coupled to the output end of center conductor 32' by conductor 66 and with the output end of shield conductor 32'' coupled to ground, the input end—point 58—of shield conductor 32''and the output end of center conductor 32''—point 60 at load 82—are electrically identical points. When pulse 56 passes point 62 on center conductor 32', it generates a similar pulse 64 in shield conductor 32'' at point 58, which is simultaneously impressed at point 60. As conductor 66, which couples point 58 to point 60, has a negligible delay upon pulse 64, pulse 64 reaches point 60 before pulse 56 which is delayed in its travel through center conductor 32'. The effect of the delay of pulse 56 with respect to pulse 64 is depicted in FIG. 2*b* in which the delay, D is a function of the length of coaxial cable 32—the longer the cable the greater the delay.

FIG. 2*b* shows the increase in the pulse rise time from base signal to peak amplitude of pulse 68 to be of the magnitude of the delay, with the resulting distortion of the pulse form factor.

Addition of coaxial cable 34 to the impedance transformer-transmission line of FIG. 3*a* corrects this deficiency as depicted in the pulse 70 of FIG. 3*b*. Here, as distinguished from FIG. 2*a*, coaxial cable 34 is electrically intermediate point 58 and point 60, and being of the same length as coaxial cable 32 provides a delay similar to that provided by coaxial cable 32. Thus, when pulse 56 passes point 62 on center conductor 32', it, as before, generates a similar pulse 64 in shield conductor 34'' at point 58. Now, as pulse 56 travels down center conductor 32' to point 60, and is delayed thereby, pulse 64 travels down center conductor 34' and is delayed a period of time equal to that of pulse 56 causing pulse 56 and pulse 64 to arrive at point 60 simultaneously. The effect of this simultaneous arrival of pulse 56 and 64 at point 60 is illustrated in FIG. 3*b* in which pulse 70 rise time is equal to that of pulse 56 or 64, but has a magnitude equal to the sum of the magnitudes of pulses 56 and 64.

Impedance transformer 38 consists of twisted pair conductors 36 and 42 wound about toroidal core 72. Core 72 is formed of a material which has a high permeability at a low frequency which, in the embodiment of FIG. 1, is assumed to be 100 kilocycles/second. Winding 36 couples the output end of center conductor 32' of coaxial cable 32 to terminal 20 of bus-bar 24 at point 40, while winding 42 couples the output end of shield conductor 32'' to coaxial cable 32 to point 40. Additionally, the output end of shield conductor 32'' is coupled to ground by way of capacitor 44. Twisted pair conductors 36 and 42 form a 25 ohm transmission line and are wound 12 times about core 72 which is a toroidal core of 0.22 O.D. x 0.06 inch thick and of a material having a high permeability at a low frequency, i.e., below 100 kilocycles/second. Impedance transformer 46 is coupled electrically intermediate coaxial cable 34 and bus-bar 24 in a manner similar to that described above for impedance tranformer 38. Each of impedance transformers 38 and 46, which are parallel coupled to bus-bar 24, has an impedance of 6.25 ohms which with a 4:1 impedance transformation causes the output end of impedance transformers 38 and 46 to look into a 25 ohm impedance formed by coaxial cables 32 and 34. An excellent discussion of broad band transformers utilizing twisted pair transmission lines is presented in the article "Some Broad-Band Transformers," by C. L. Ruthroff, in Proceedings of the IRE, pages 1337–1342, August 1959.

The parallel combination of resistors 48 and capacitor 50 couples the input end of shield conductor 34'' to ground to form a D.C. bias network. The value of capacitor 50 is selected to be sufficiently high to provide a negligible impedance at the frequency considered while the value of the resistor 48 is selected to provide the proper D.C. bias level with the expected load and duty cycle.

With resistors 48 and capacitor 50 removed the wave forms as illustrated in FIGS. 2*b* and 3*b* and with a 50 percent duty cycle would assume the minimum and maximum values of −1.25 volts and +1.15 volts, respectively. Increasing the magnitude of resistor 48 causes the wave forms to go more negative; with resistor 48 removed the wave forms assume a maximum positive value. The operating point—D.C. level—of winding 30 with one terminal grounded is determined by the input signal, its duty cycle, and the load wherein the operating point is such that the area under the operating point is equal to the area above the operating point for one duty cycle. Thus the magnitude of resistor 48 is to be determined for each embodiment where the input signal, its duty cycle, and the expected load will determine its proper value for each specific set of conditions.

As pointed out in the stated objective, a primary purpose of this invention is to provide a broad band impedance transformer which when a plurality thereof are utilized in an electrical transmission line pulse transformer/distribution system provides control pulses of similar delay and form factor reliability to a plurality of bus-bars. This objective is achieved by splitting the transmission line output signal and coupling each of the two similar signals to respective portions of a bus-bar which in the above discussed application was a copper strap 25.0 inches long by 0.375 inch wide by 0.125 inch thick. Due to the high frequency of the signals applied to the bus-bar is was found that the signal form factor could vary at each point along the bus-bar unless the terminals at which the signals were coupled to the bus-bar—terminals 20 and 22 of FIG. 1—were properly located with respect to the bus-bar geometry. In the above discussed application terminals 20 and 22 were each located approximately one-fourth of the total length of the bus-bar from the respective bus-bar ends. In any other application the location of the terminals would be determined by several factors including pulse frequency and bus-bar geometry.

With particular reference to FIGURE 4 there is presented another embodiment of the present invention in which pulse generator 100 is coupled to input transformer 102 driving transmission line 104 and output transformer 106 the outputs of which are coupled to bus-bar distribution system 108 at a plurality of terminals 110–114 that are selectively spaced on substantially three-dimensional bus-bar 122 from which a plurality of loads 124–134 are driven. This embodiment is presented to illustrate another arrangement of components similar to those of FIGURE 1 but in which the impedance matching requirement of pulse generator 100 to bus-bar distribution system 108 is different than that of FIGURE 1. In this embodiment the output of generator 100 is coupled across the input winding of input transformer 102 with the output winding thereof coupled across the input ends of cables 140, 142 and 144. Each of cables 140, 142 and 144 is coupled on its output end to two output transformers 146, the outputs of which are coupled to terminals 110–112 on bus-bar 122.

As is well known by those of ordinary skill in the art the specific design criteria for each application of the present invention dictates the detail requirements of the components thereof. As an example: primary to secondary turns ratios of transformers 102 and 146; the number of parallel-arranged transmission-line impedance-matching coaxial cables 140 and 142 and signal delay compensating coaxial cable 144; the number and arrangement of transformers 146. Additionally, when operating at pulse frequencies different than that for which the embodiment of FIGURE 1 was specifically designed, cables 140, 142 and 144 may be replaced by other transmission line forms such as a twisted-pair line. Further, the bifilar-wound and twisted pair winding arrangement of transformers 102 and 146, respectively, may be varied to suit the specific system requirement encountered.

It is understood that suitable modifications may be made in the structure as disclosed provided such modifications came within the spirit and scope of the appended claims. Having now, therefore, fully illustrated and described our invention, what we claim to be new and desire to protect by Letters Patent is:

1. An impedance transformation device for coupling a high output impedance generator of a high frequency signal to a low impedance bus-bar distribution system, comprising in combination:

a plurality of cores of magnetic material;

a current dividing network including a plurality of transmission lines, one portion of each but one of said transmission lines coupled to a separate one of said cores;

a bus-bar;

a plurality of impedance transformers;

an input transformer the output of which is coupled to the input of said current dividing network;

the output of said current dividing network split with each output coupled to a different one of said impedance transformers;

the outputs of said impedance transformers coupled to respective different portions of said bus-bar.

2. An impedance transformation device for coupling a high output impedance generator of a high frequency signal to a low impedance bus-bar distribution system, comprising in combination:

a plurality of cores of magnetic material having a high permeability;

a current dividing network comprising a plurality of coaxial cables, one portion of each but one of said cables coupled to a separate one of said cores;

a bus-bar distribution system;

a bifilar wound input transformer the output of which is coupled across the input of said current dividing network;

a plurality of impedance transformer;

the output of said current dividing network split with each output coupled to different ones of said impedance transformers, each impedance transformer comprising a twisted pair transmission line wound about a separate toroidal core of magnetic material having a high permeability;

the outputs of said different ones of said impedance transformers coupled to respective different portions of said bus-bar distribution system.

3. An impedance transformation device for coupling a high output impedance generator of a high frequency, substantially square wave, clock pulse signal to a low impedance bus-bar distribution system, comprising in combination:

an input transformer;

a current dividing network including two substantially equal length coaxial cable transmission lines;

two substantially similar impedance transformers;

a bus-bar distribution system;

a core of magnetic material;

said input transformer having bifilar wound input and output windings, said output winding coupled across said coaxial cable transmission lines, one portion of only one of said transmission lines coupled to said core of magnetic material;

the output end of each of said coaxial cable transmission lines coupled to a separate one of said impedance transformers, said impedance transformers having twisted pair input and output windings;

one end of the input and output winding of each impedance transformer coupled to each other and said coupled ends coupled to separate portions of said bus-bar distribution system such that the clock pulse has a substantially similar wave form at any point along said bus-bar.

4. An impedance transformation device for coupling a high output impedance generator of a high frequency clock pulse signal to a low impedance bus-bar distribution system, comprising in combination:

an input transformer;

two substantially similar impedance transformers;

a bus-bar distribution system;

said input transformer having bifilar input and output windings, with each winding having first and second terminals;

means coupling said pulse generator across said input transformer input winding first and second terminals;

a current dividing network including;

a toroidal core of magnetic material;

said a first coaxial cable having a first portion wound about a toroidal core to form an impedance transformer and having a second portion forming a transmission line;

a second coaxial cable of a length substantially equal to that of said first coaxial cable;

the input end of the center conductor of said first coaxial cable coupling the said input transformer output winding first terminal to a first terminal of said bus-bar distribution system by way of a first conductor of said first impedance transformer;

the input end of the shield conductor of said first coaxial cable coupled to a second terminal of said bus-bar distribution system by way of the center conductor of said second coaxial cable and a first conductor of said second impedance transformer;

means coupling the output end of the shield conductor of said first coaxial cable to said first terminal of said bus-bar distribution system by way of a second conductor of said first impedance transformer;

said input transformer output winding second terminal coupled to said second terminal of said bus-bar distribution system by way of the shield conductor of said second coaxial cable and a second conductor of said second impedance transformer;

separate capacitor means coupling said bus-bar distribution system first and second terminals to ground by way of second conductors of said first and second impedance transformer;

a parallel arranged resistor and capacitor means coupling said input transformer output winding second terminal to ground.

5. In a high frequency signal pulse transformer/distribution system, the combination of:

a plurality of cores of magnetic material;

a current dividing network including a plurality of transmission lines, all but one of which transmission lines is coupled to a separate one of said core of magnetic material;

a bus-bar;

the outputs of said transmission lines coupled to respective separate points of said bus-bar for producing at any point on said bus-bar signals of substantially similar waveform as said high frequency signal and of substantially similar delay with respect to said high frequency signal.

6. In a high frequency signal pulse transformer/distributor system, the combination of:

a generator of a high frequency signal;

a bus-bar;

a core of magnetic material;

a current dividing network including two transmission lines for coupling said signal from said generator in series across said bus-bar;

at least a portion of only one of said transmission lines wound about said core of magnetic material;

one end of each of said transmission lines coupled to said generator the other ends of each of said transmission lines coupled in parallel to respective separate points along said bus-bar.

7. In a high frequency signal pulse transformer/distributor system, the combination of:

a generator of a high frequency signal;

a bus-bar;

a plurality of cores of magnetic material;

a current dividing network including a transmission line system for coupling said generator signal to said bus-bar;

said transmission line system including a plurality of coaxial cable, said coaxial cables coupled in series across said generator and said coaxial cables coupled in parallel to respective separate points on said bus-bar;

all but one of said coaxial cables separately magnetically coupled to a separate one of said cores;

said current dividing network splitting said generator signal thereby generating signals in each of said coaxial cables of a substantially similar waveform for timing and producing at any point along said bus-bar output signals of substantially similar waveform and timing.

8. In a high frequency signal pulse transformer/distributor system, the combination of:

a current dividing network comprising two coaxial cables;

a toroidal core of magnetic material;

a bus-bar distribution system comprising a unitary conductor having separate first and second input terminals;

a first coaxial cable of said current dividing network having a first portion wound about said toroidal core to form an impedance transformer;

a second coaxial cable of said current dividing network of a length substantially equal to that of said first coaxial cable;

means coupling the input end of the center conductor of said first coaxial cable to the said pulse generator;

means coupling the input end of the shield conductor of said first coaxial cable to the input end of the center conductor of said second coaxial cable;

means coupling the input end of the shield conductor of said second coaxial cable to the said pulse generator;

means coupling the output end of the center conductor of said first coaxial cable to said first input terminal of said bus-bar distribution system;

means coupling the output end of the center conductor of said second coaxial cable to said second terminal of said bus-bar distribution system;

separate capacitor means coupling the output ends of each of said first and second coaxial cables, respectively, to ground, and a parallel arranged resistor and capacitor biasing means coupling the input end of said second coaxial cable shield conductor to ground.

References Cited by the Examiner

UNITED STATES PATENTS

| | | | |
|---|---|---|---|
| 1,729,713 | 10/1929 | Dicke | 307—32 X |
| 2,387,797 | 10/1945 | Keiser | 307—32 X |

FOREIGN PATENTS

| | | |
|---|---|---|
| 2,060 | 11/1879 | Great Britain. |

OTHER REFERENCES

Terman: "Electronic and Radio Engineering, McGraw-Hill, New York, 1955, pp. 76–77.

HERMAN KARL SAALBACH, *Primary Examiner.*

M. NUSSBAUM, *Assistant Examiner.*